United States Patent [19]
Dixon et al.

[11] Patent Number: 4,464,718
[45] Date of Patent: Aug. 7, 1984

[54] ASSOCIATIVE FILE PROCESSING METHOD AND APPARATUS

[75] Inventors: Jerry D. Dixon, Boca Raton; Robert H. Farrell, Coral Springs; Gerald U. Merckel, Delray; Jack D. Neely, Boca Raton, all of Fla.; Stephen A. Schmitt; William G. Verdoorn, Jr., both of Rochester, Minn.; Peter B. Bandy, Pine Island, Minn.

[73] Assignee: International Business Machines Corporation, Armonk, N.Y.

[21] Appl. No.: 404,200

[22] Filed: Jul. 30, 1982

[51] Int. Cl.³ .............................................. G06F 15/38
[52] U.S. Cl. .................................................. 364/200
[58] Field of Search ... 364/200 MS File, 900 MS File, 364/300

[56] References Cited

U.S. PATENT DOCUMENTS

| | | | |
|---|---|---|---|
| 3,243,783 | 3/1966 | Rabenda et al. | 340/172.5 |
| 3,350,694 | 10/1967 | Kusnick et al. | 340/172.5 |
| 3,408,631 | 10/1968 | Evans et al. | 340/172.5 |
| 3,629,860 | 12/1971 | Capozzi | 340/172.5 |
| 3,729,712 | 4/1973 | Glassman | 364/900 |
| 3,848,235 | 11/1974 | Lewis et al. | 340/172.5 |
| 4,038,642 | 7/1977 | Bouknecht et al. | 364/900 |
| 4,246,637 | 1/1981 | Brown et al. | 364/200 |

Primary Examiner—Raulfe B. Zache
Attorney, Agent, or Firm—Sughrue, Mion, Zinn, Macpeak, and Seas

[57] ABSTRACT

A method and apparatus for performing data base searches in which the host processor and main memory are free for other processing tasks between the time that the host processor requests the search until the search results are reported back to the host processor. To commence the search, an input/output controller communicates from the host processor to a record scan circuit values of a skip length, a key length and a data length. While data records are received serially from disk files, within each data record, a length of data equal to the specified skip length is initially skipped. Following this, a search argument is compared with a length of data specified by the key length value. This comparison operation is alternated with skipping of data specified by the data length value until the end of the record is reached or until a specified number of comparisons has taken place. The data record is stored as it is received from the files. If a successful comparison is found within a data record, either the entire data record or a specified portion thereof can be read back through the controller to the host processor.

29 Claims, 17 Drawing Figures

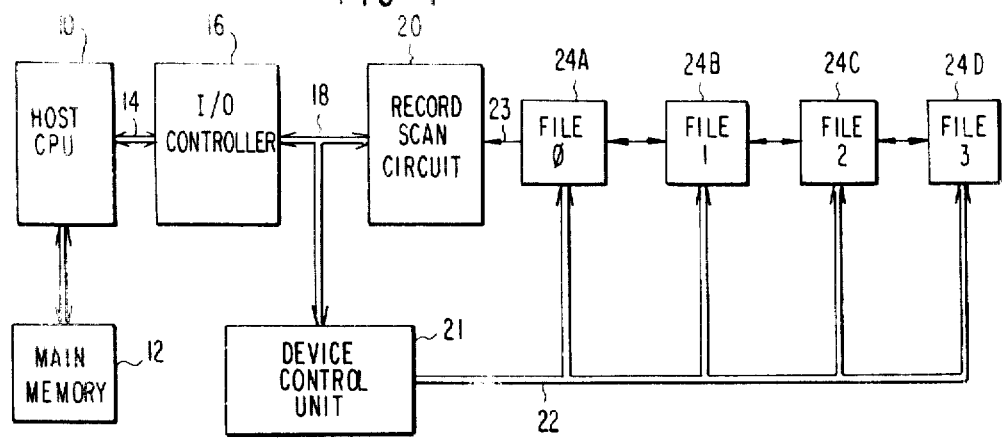

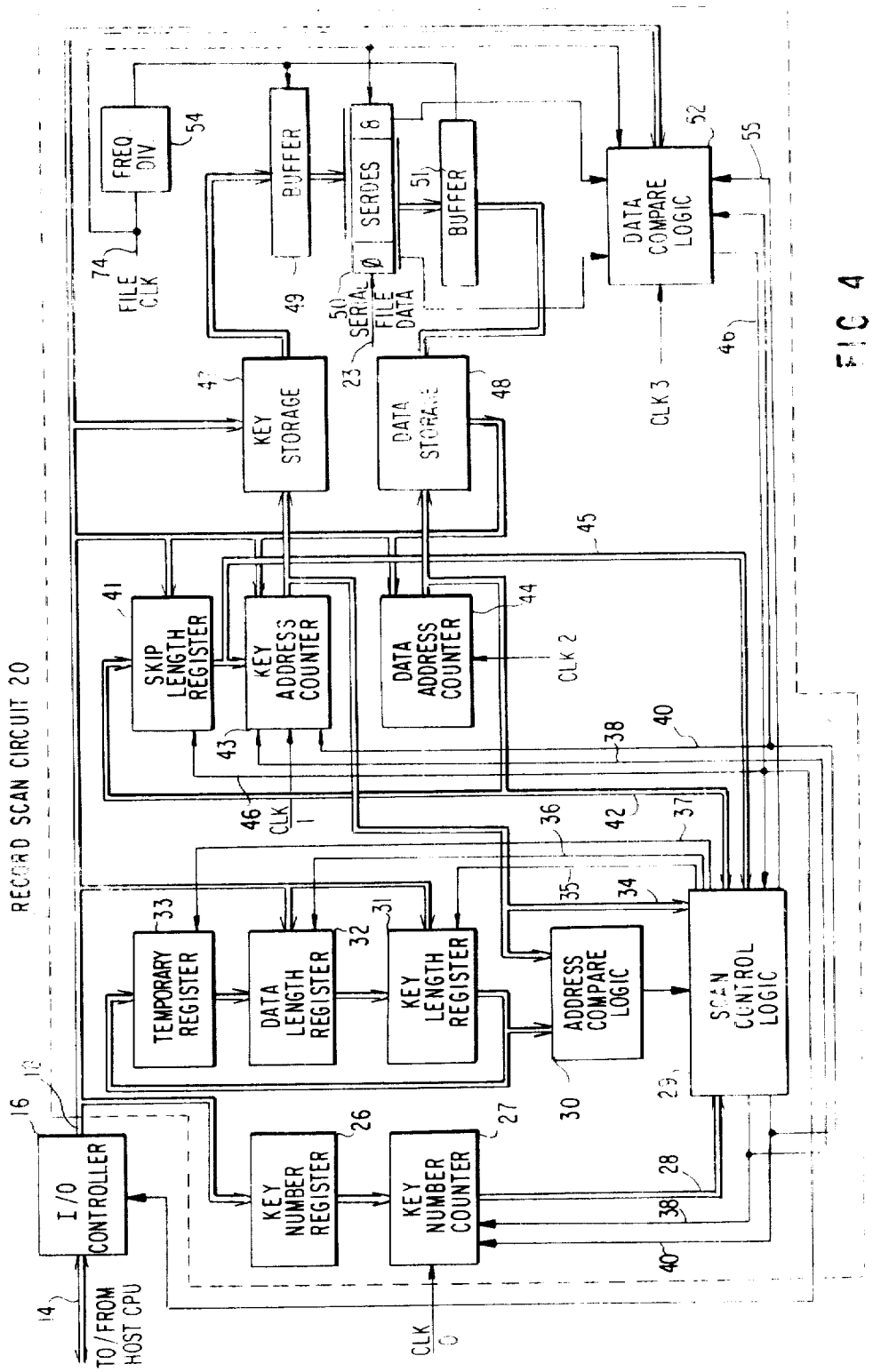

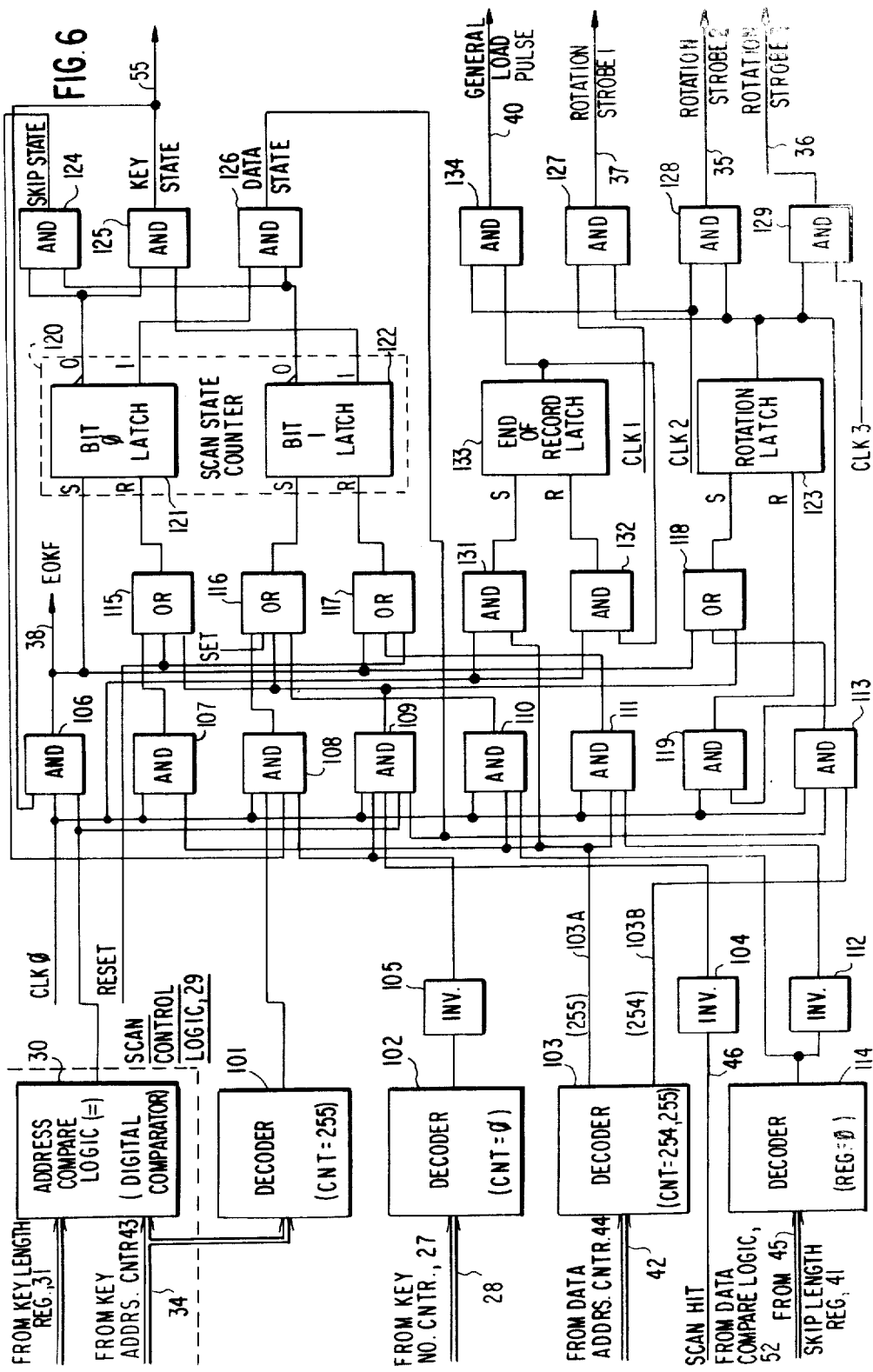

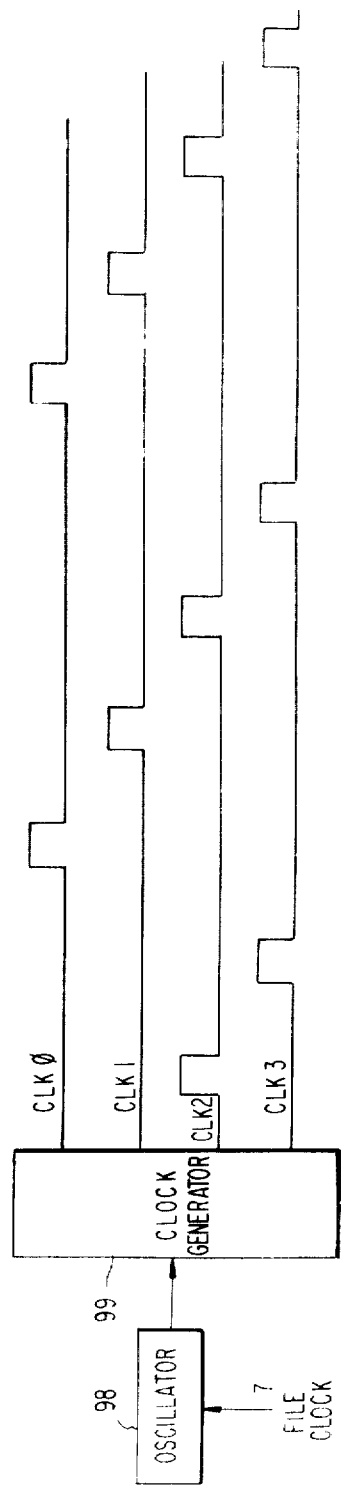

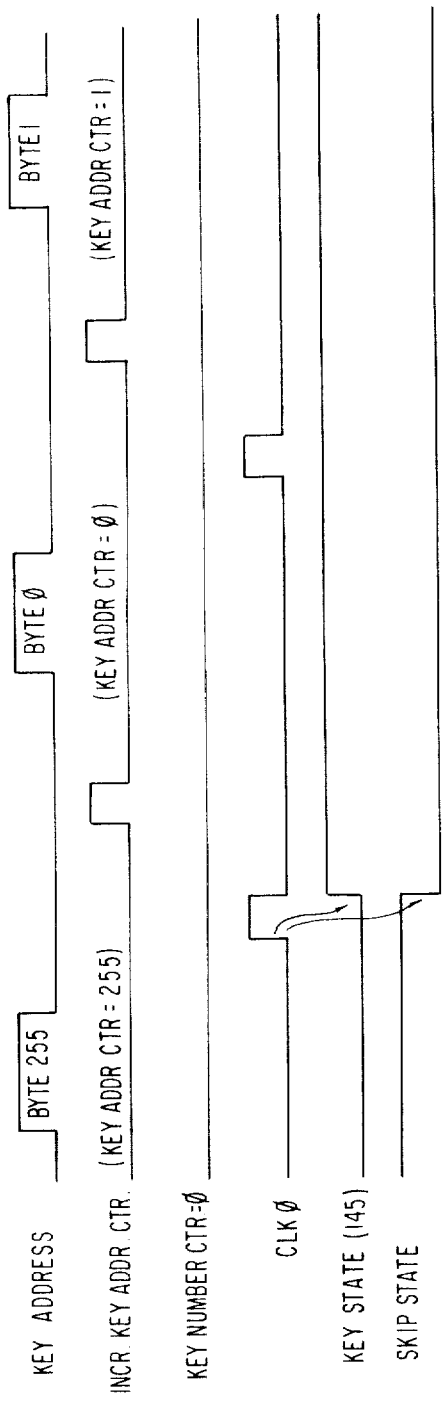

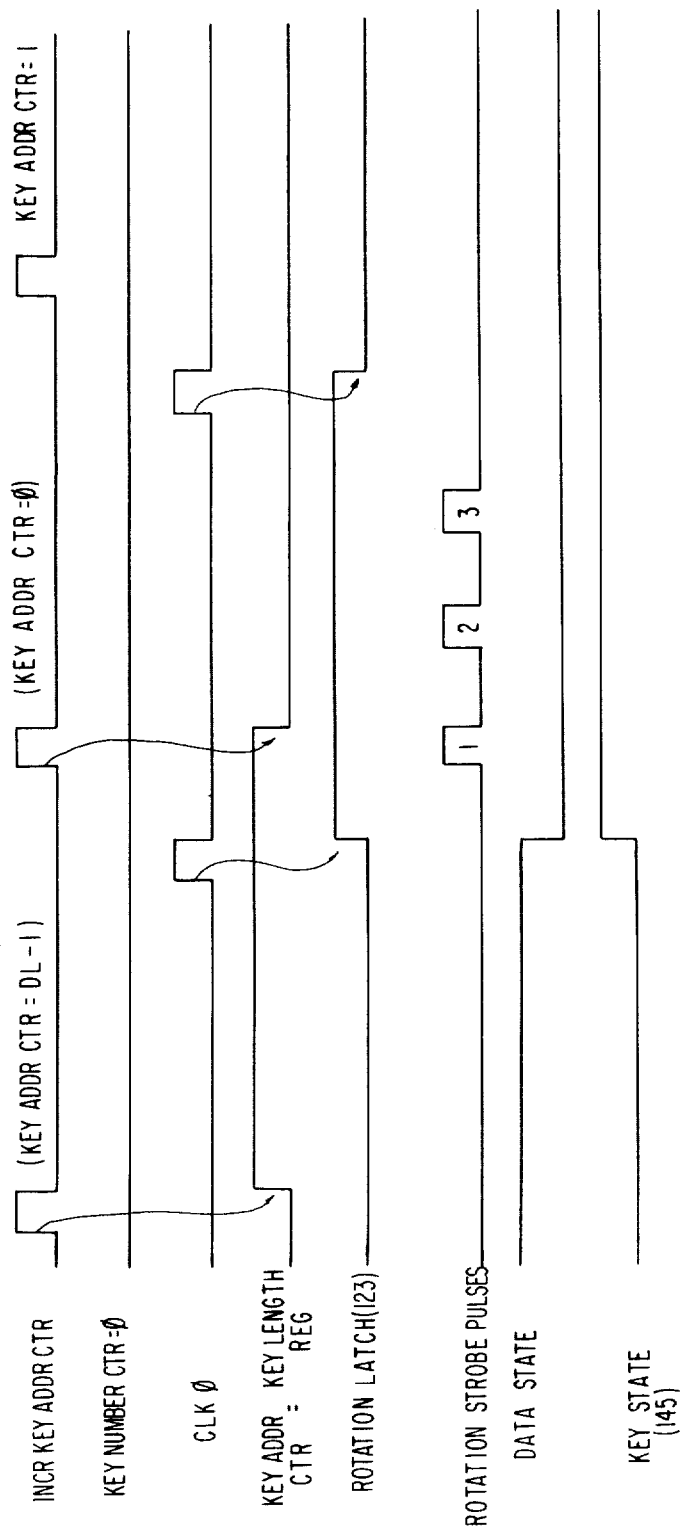

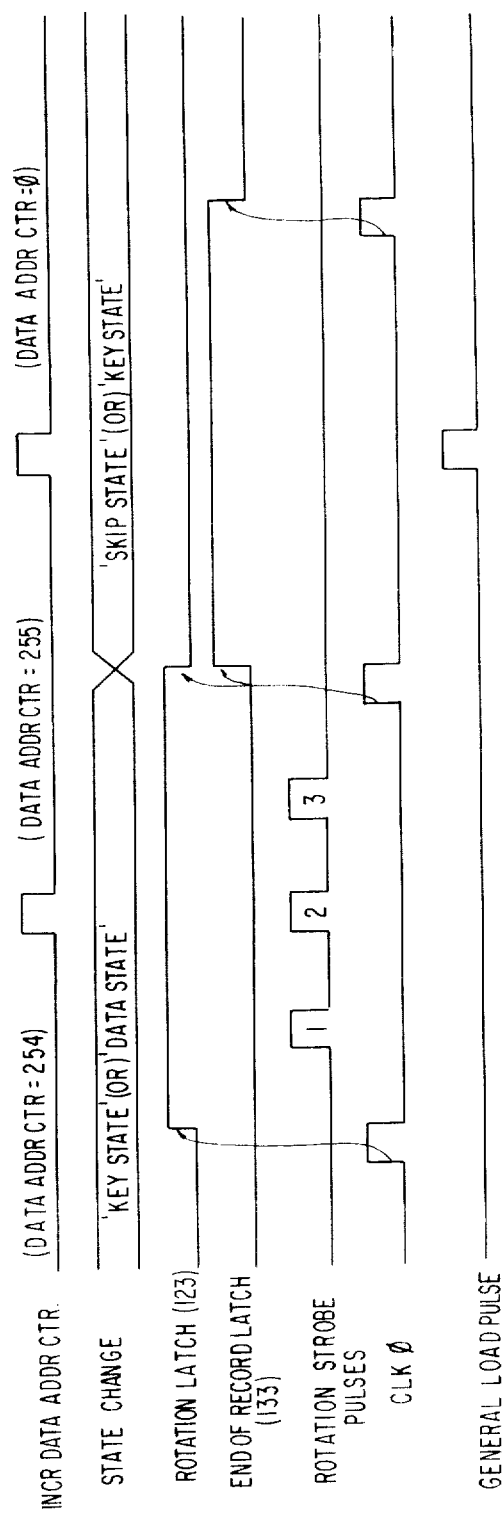

ASSOCIATIVE FILE PROCESSING METHOD AND APPARATUS

BACKGROUND OF THE INVENTION

The invention pertains to a method and apparatus for performing data base searches among data stored in a disk file system. A typical computer system in which data base searches are to be performed includes a main or host processing system, having a central processing unit and one or more high speed random access memories connected to the host processor, and one or more disk file memories, also connected to the host processor. The high speed main memory is utilized for executing operating programs and the like, while the lower speed disk file memories are utilized for storing large amount of "raw" or base data.

Data is stored in the disk file memories as a series of data records, each of a fixed number of bytes. When it is desired to perform a data base search of data located within the disk file memories, a "key" or search argument is compared with specified portions of the data read out from the disk file memories.

In the prior art, such data base searches were most commonly performed by first reading a predetermined number of data records from the disk file memories into the main memory and performing the actual comparison operation between the key or search argument and the specified portions of the data records within the host processor. This was of course a slow and hence costly operation. Much time was required in reading the data from the disk file memories into the main memory and in then performing the comparison operation within the host processor. The host processor could not be utilizdd for other tasks during any of this time.

U.S. Pat. No. 3,243,783 issued Mar. 21, 1966 to Rabenda et al., describes a file search system of this basic type. In that system, certain records are selected from a group of records and read into main storage with remaining records skipped. However, the host processor is still engaged and unavailable for other processing operations during the entire search operation.

U.S. Pat. No. 3,350,694, issued Oct. 31, 1967 to Kusnick et al., describes a search system in which search requests are re-ordered in a key storage to continually present the best accessing sequence to a readout transducer. The readout transducer can then extract the desired information from the disk file memories in an order which minimizes the time that the main processor is engaged. As in the previously discussed case, however, the central processor is unavailable for other tasks during the entire search operation.

Similarly, U.S. Pat. No. 3,408,631, issued Oct. 29, 1968 to Evans et al., describes a record search system in which rotational delays, that is, delays in reading data from the disk file memories due to the time required to rotate the disks to the desired starting position, are minimized. According to that system, the transfer of a desired record to its associated electronic data processor (EDP) is accomplished during a single traverse of the record. After the access mechanism has been positioned in the disk file unit, a record start signal begins the comparison process between the subsequent data signals and the search argument held in the associated EDP. The actual comparison is performed in the file control unit. The disk file control unit signals the EDP when the argument and the data signals are equal. Additionally, the file control unit can be instructed to signal the EDP when the comparison between the search argument and the data signals is either high or low. The EDP then initiates the subsequent transfer of the desired record from the bulk storage unit. No rotational delay exists when the key signals precede the data signals in the record. Therefore, the EDP is only involved with the record retrieval operation for a minimum time duration. Nevertheless, the main processor (the EDP) is still unavailable for other processing operations during the whole record search operation.

U.S. Pat. No. 3,629,860, issued Dec. 21, 1981 to Capozzi, teaches a record locating apparatus for variable length records on magnetic disk units. In one embodiment of this system, the apparatus determines the length of time required for each selected record position to reach its respective read/write head, and in the event considerable delay would be encountered, it freezes the channel and control unit for other processing work during the delay. Although the overall time for completing the record search operation may be reduced to the utilizing system, the main processor is still engaged during the entire active period of the record search operation, that is, during the actual searching of the records once they have been read into the main storage.

U.S. Pat. No. 3,848,235, issued Nov. 12, 1974 to Lewis et al., teaches a scan and control apparatus for a disk storage drive in which disk storage rotational delays are eliminated where the records on the disk media do not have a separate key field with a gap between the key and data fields. This is accomplished by providing a decode apparatus for detecting a hexadecimal FF transferred from the scan data field in main storage to the disk storage drive attachment. The scan data field in the main storage contains the search key at the head of the field and the remainder of the field is filled with hexadecimal FF. The scan operation takes place by transferring the scan data field from main storage a bit at a time in comparing the search key for main storage with the key in the disk data field. The comparison takes place until the disk storage drive detects a hexadecimal FF. This indicates the comparison operation is complete and sets the operation from a scan mode to a read mode whereby, if the key of the disk data field is equal to the search key, the remaining bits of the disk data field are transferred into the scan data field in main storage with one hexadecimal FF between the search key and the scan field and the newly transferred bits from the disk data field. The single hexadecimal FF functions to absorb the switching time for changing from a scanning to a read mode while still delineating the end of the search key.

In all of the above systems, although some delays are eliminated, still the main processing unit (host processor) is engaged and unavailable for performing processing operation during substantially the entire rècord scanning operation. Also, these systems generally require an amount of main storage sufficient to hold all of the data records which it may desired to search. In many instances, this may mandate a much larger size for the main storage than would be required for only the execution of operating programs and the like.

Accordingly, it is a primary object of the present invention to provide a record scanning method and apparatus in which the main or host processor is free to perform other tasks while the record scanning operation is taking place.

More specifically, it is an object of the invention to provide such a record scanning method and apparatus in which the host processor can simply transfer to an outboard record scanning circuit the parameters necessary to perform the record search and later receive from the record scanning circuit the results of the search. In the desired method and apparatus, from the time that the host processor instructs the record scanning circuit as to the parameters of the search to be performed until the time that the record scanning circuit reports the results of the search to the host processor, the host processor is free to perform other tasks.

SUMMARY OF THE INVENTION

In accordance with these and other objects of the invention, there is provided a method and apparatus for performing a search of data records in which, in order to start the search of data records, an external controller first specifies values of a skip length, a key length and a data length and provides a search argument which corresponds in length to the key length. A serial stream of data is then received from the disk files commencing from a predetermined location. For each data record received from the files, a comparison operation is performed. This done by skipping an initial length of data in each record corresponding in length to the skip length. After this, the search argument is compared with a key field of the data having the same length as the key length and search argument. Following the initial comparison operation, a subsequent length of data is skipped in a length specified by the data length. A segment of the record corresponding to the key length is then again compared with the specified search argument, after which again a length of data specified by the data length is skipped. The compare-and-skip operation is continued until the end of the record or until a specified number of comparison have taken place.

As the data is received from the disk files, each data record is stored. If a "hit" is found within the data record, that is, if a successful comparison between the search argument and one of the key fields has occurred, either the entire data record or a specified part thereof can be read by the external controller. The location of the data where the "hit" occurred within the data record may also be stored and communicated to the host processor through the external controller.

In a preferred embodiment, the search argument is stored in a memory within the record scan circuit. The search argument is then read out byte-by-byte from this memory and compared serially bit-by-bit with the serial stream of data received from the files. To do this, a shift register is provided which is one bit longer than the search argument. The search argument is loaded into all bit positions, except for one end bit position, of the shift register while data from the files is shifted into the shift register serially from the remaining end bit position. Shifting of the data within the shift register than takes place while a comparison is made between the two end bits of the register.

BRIEF DESCRIPTION OF THE DRAWINGS

FIG. 1 is a block diagram of a computer system in which a record scan circuit of the invention is used to advantage;

FIG. 2 shows the format of a search request block used in the computer system of FIG. 1 to initiate scanning of data records;

FIG. 4 is a block diagram of a record scan circuit of the system shown in FIG. 1;

FIG. 6 is a detailed schematic diagram of a scan control logic circuit utilized in the record scan circuit of FIG. 4;

FIG. 7 is a diagram indicating clock signals, the timing relationship thereamong, and a clock generating circuit utilized in the circuit of FIG. 4;

FIGS. 9A-9E are a series of timing diagrams illustrating the operation of the record scan circuit shown in FIG. 4.

DESCRIPTION OF THE PREFERRED EMBODIMENTS

Figures 3A, 3B:
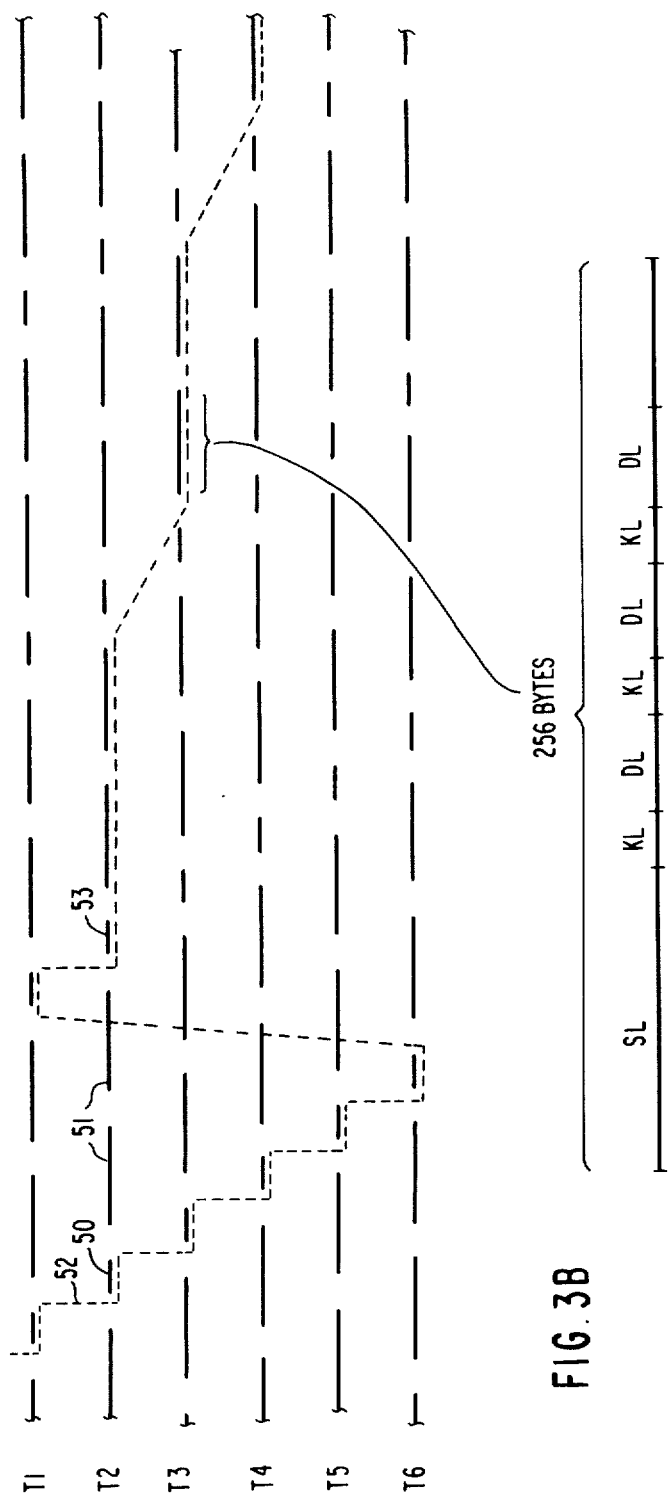
FIG. 3A is a diagram showing an arrangement of data record identifiers and data records stored on a disk memory.
FIG. 3B is a diagram showing an expanded view of one of the data records shown in FIG. 2A.

A computer system including a record scan circuit of the invention is shown in block diagram form in FIG. 1. A main or host CPU (Central Processing Unit) 10 is connected to a main memory 12 in a standard fashion. The host CPU 10 is connected via a bus 14 to an I/O controller 16. The functions of the I/O controller 16 include receiving data scan requests from the host CPU 10 (in the form of search request blocks as shown in FIG. 2), assembling the data necessary for performing the record scanning operation, and relaying the information necessary for performing the record scanning operation to the record scan circuit 20 and a device control unit 21 which is connected via bus 22 to a number of disk files 24A-24D.

The construction of the host CPU 10, main memory 12, I/O controller 16 and device control unit 21 are themselves well known and hence will not be discussed here in detail. Examples of central processing units, main memories and disk memories are so well known as to not require citation of specific examples. For an example of an appropriate I/O controller and device control unit, such as those indicated by reference numeral 16 and 21 in FIG. 1, reference may be made to U.S. Pat. No. 4,038,642, issued July 26, 1977 to Bouknecht et al., and U.S. Pat. No. 4,246,637, issued Jan. 20, 1981 to Brown et al., both of which are assigned in common with the present application.

To perform a search of data records, the host CPU 10 first transmits a search request block as shown in FIG. 2 to the I/O controller 16. After transmission of this search request block to the I/O controller 16, the host CPU 10 is free to perform other tasks. That is, the search is performed entirely without the further need of the host CPU 10. After transmission of the search request block to the I/O controller 16, the next involvement of the host CPU 10 with the search is when the results of the search are reported back to the host CPU 10 from the record scan circuit 20 through the I/O controller 16. Thus, a considerable savings in host CPU processing time is achieved, thereby resulting in a significantly improved throughput rate for the overall system.

The search request block of FIG. 2 is composed of eight Words 0-7, each of which is composed of 16 bits (although other block and word lengths can be used if desired). Word 0 contains control or command bits. For instance, when a "hit" is found in a data record indicating that the desired data has been located, it may be desired to return the whole record or, alternatively, only a designated portion thereof. The command bits of Word 0 can be used to specify which of these alternatives is desired. Word 1 contains a key number KN and skip length SL which relate to the position of the number of keys or scan arguments which are to be searched in the specified data records and an amount of data to be shipped within data records during a search. (The meaning of these terms will become clear in the discussion below of FIGS. 3A and 3B.) Word 2 and a portion of Word 3 contain a relative block address (RBA) which specifies where in the files 24A–24D the search is to be commenced. In response to the RBA, the device control unit 21 signals the files 24A–24D to begin outputting records starting from this location. The actual scanning search performed by the record scan circuit 20 commences at the beginning of the outputting of this data. Word 3 also contains a record count. The record count specifies the extent of the search to be conducted. For instance, by allowing the record count to vary between 1 and 4,096 records (of, for example, 256 bytes each) to permit a corresponding number of records to be searched. The residual status block address of Word 4 specifies a starting location in the main memory 12 where a residual status block is to be stored. The information contained in this residual status block may be any information obtained as the result of the search operation to be performed. Word 5 specifies a search request block chain address. With this chain address, subsequent search request blocks can be fetched from the main memory 12 without having to interrupt the host CPU 10.

The data length DL and key length KL in Word 6 respectively specify a number of bytes of data (termed a data field) to be skipped in each record being scanned and a number of bytes of data (termed a key field) to be compared with the key or search argument. This will be explained in more detail below in conjunction with the discussion of FIG. 3. Finally, in Word 7 is specified the address in the main memory where the search argument is to be found. This search argument is transferred from the main memory through the I/O controller 16 to the record scan circuit 20 and there compared with the data in the key field in the records received serially from the files 24A–24D in a manner which will be described in full detail below.

Referring now to FIGS. 3A and 3B, the arrangement of data identifiers and data records on each of the disk files 24A–24D will be explained. T1–T6 represent tracks on different parallel disk platters, which rotated simultaneously at the same speed upon a single spindle or shaft in one of the files 24A–24D, with the tracks T1–T6 all being part of the same data "cylinder". Each track T1–T6 is composed of a series of data identifiers 50 and data records 51. For instance, two data records 51, each composed 256 bytes, may be provided following each identifier 50. Vertically adjacent identifier codes, for instance, those in tracks T2 and T3, are arranged with the end of the upper one of the identifiers 50 immediately above the beginning of the lower one of the two identifiers. Also, the end of the identifier in the lowest track T6 is arranged to be vertically nearly directly below the beginning of the identifier in track T1 following the two data records preceded by the identifier in track T1 which was last scanned. The identifiers 50 are arranged in numerical sequence along a dotted line 52 indicated in FIG. 3A. With the identifiers so arranged, a search thereamong can rapidly be carried out by scanning the identifier codes located along the line 52. Once the identifier 50 is located which corresponds to that specified by the relative block address of FIG. 2, here indicated by reference numeral 53, the data records subsequent to the identifier 53 are read out in sequence, serially bit-by-bit, in the order indicated by the dotted line 52.

Referring now specifically to FIG. 3B, the division of a single data record 51 in accordance with the invention will now be explained. The skip length SL of the search request block FIG. 2 specifies a number of bytes of data from the beginning of the record which are to be ignored in performing the comparison operation. At the end of the skip length, the number of bytes of the record specified by the key length KL are compared with the search argument which was earlier read out from the main memory 12 from the location specified in Word 7 of the search request block. Following the initial comparison operation in the first key field, a number of bytes specified by the data length DL in Word 6 is skipped, after which the succeeding KL number of bytes of the record, which forms the second key field to be scanned, is compared with the same search argument. This operation is again followed by skipping a data field of DL bytes of data. This compare-and-skip procedure is continued until either a "hit" is found or the number of key fields specified by the key number KN in Word 1 of the search request block have been scanned without a "hit". If no "hit" is found within the record, the same skip-compare-skip procedure is carried out with next records in sequence until either a "hit" is found or the total number of records scanned is equal to the record count specified in Word 3 of the search request block.

It is to be noted that the numbers of bytes within each record specified by each of the skip length, key length and data length of the search word are entirely arbitrary and that, consequently, any desired portion or portions of any record can be examined as desired. The manner in which scanning of data records is carried out in accordance with the invention is particularly advantageous in a number of different situations. For instance, in some cases a particular piece of information (corresponding to the key or search argument) may be located in any of a number of possible positions within a data record. By the use of multiple key fields, such a record can efficiently be scanned.

Referring to FIG. 4, a detailed block diagram of the record scan circuit 20 is shown. As mentioned previously, the record scan circuit 20 is coupled to the I/O controller 16 via a bi-directional bus 18. The bus 18 is coupled to preset inputs of a key number register 26, a data length register 32, a key length register 31, a skip length register 41, a key address counter 43 and a data address counter 44. The bus 18 is used to load the key address counter 43 and the data address counter 44 with all zeros at the beginning of a search operation. Also, the bus 18 transfers on specified lines thereof to the data compare logic 52 controls bits which determine the type of comparison to be performed between the search argument and the key fields of the records being scanned. The comparisons may be any one of $=$, $\neq$, $\geq$, ≦, > and <. The bus 18 is also coupled to data inputs of a key storage 47 for transferring to the key storage 47 the search argument prior to the beginning of a search operation.

The outut of the key number register 26 is coupled to preset inputs of a key number counter 27 to thereby transfer to the key number counter 27 the key number KN specified in the search request block being processed.

The data length register 32 and key length register 31 are connected in a circulating arrangement with a temporary register 33 so that data can be rotated among the three registers, that is, the data from the key length register 31 transferred to the temporary register 33, the data from the temporary register 33 transferred to the data length register 32, and the data from the data length register 32 transferred to the key length register 31.

The output of the skip length register 41 is connected to the preset inputs of the key address counter 43. The output of the key address 43 and the key length register 31 are compared by an address compare logic 30, which outputs a signal indicating the result of the comparison operation to a scan control logic 29.

The data address counter 44 is provided to specify where in a data storage 48 data received from the disk file is to be stored. Both the key storage 47 and the data storage 48 can be implemented with a random access memory (RAM) and, if desired, can be the same memory with input and output lines time shared. The output from the data address counter 44 is also fed back to the skip length register 41 and to the scan control logic 29.

The data output from the key storage 47 is fed to a first buffer 49. The output from the first buffer 49 is fed to parallel-entry inputs of a SERDES (Serializer-Deserializer), the serial data input of which is the serial bit stream of data received from the disk file. A second buffer 51 receives the output data from the SERDES 50. As shown in FIG. 4, a FILE CLOCK signal on line 74, which has pulses synchronous with the bits of data in the serial bit stream from the disk file, directly clocks the SERDES 50, while that signal divided in frequency by eight by a frequency divider 54 is used to clock the buffers 49 and 51.

Another possibility for transferring data in and out of the SERDES 50 is to use a "handshaking" arrangement in which the SERDES is clocked with the FILE CLOCK signal while operations within the record scan circuit are clocked with an internally supplied clock signal. In that case, double buffers are provided on either side of the SERDES 50 with the buffers connected directly to the SERDES 50 being clocked in synchronization with the FILE CLOCK signal and the buffers connected directly to the key storage 47 and the data storage 48 clocked in synchronization with the internal record scan circuit clock. Such clocking schemes are well known per se. One such scheme is used in the Model No. 62PC disk file of the System 34 computer system manufactured and sold by the assignee IBM Corporation. Reference may be made to the reference manual therefor for further details.

As an example, it is here assumed that the SERDES 50 is 9 bits in length. In that case, the data output from the first buffer 49 is fed to the eight most significant bits of the SERDES 50. The eight least significant bits from the SERDES 50 are transferred in parallel form to the second buffer 51.

The zeroth and the eighth (the least and most significant bits, respectively) from the SERDES 50 are compared by a data compare logic 52 so as to perform a data comparison operation selected from among =, ≠, ≧, ≦, > and <. (The details of the data compare logic 52 are shown below in FIG. 5 and will be discussed in conjunction therewith.) An output signal SCAN HIT in the active (logical "1") state is produced on a line 46 whenever the data compare logic 52 detects a "hit", as determined by the selected type of data comparison operation, between the data coming from the disk file and the search argument from the key storage 47. The SCAN HIT signal is communicated to the scan control logic 29 and to the I/O controller 16 on line 46.

The operation of the record scan circuit 20 will now be discussed in detail.

At the commencement of a search operation, that is, a search operation performed in response to a single search request block of the type shown in FIG. 2, the I/O controller 16 presets the key number register 26 with the key number KN from the search request block. This same value is then transferred to the key number counter 27 upon preset inputs thereof. The key length register 31 is preset with a value KL-1. The subtraction (KL minus one) can be performed by the I/O controller 16 or a separate subtractor circuit provided between the bus 18 and the input to the key length register 31, as preferred. Similarly, the data length register 32 is preset with a value DL-1. The key address counter 43 and the skip length register 41 are initialized to 256-SL (i.e., $(256-SL)_{MOD256}$), and the data address counter 44 is initialized to zero by the I/O controller 16 via the bus 18. If the skip length is zero, a scan state counter within the scan control logic 29 is initialized to the key state. Otherwise, the scan state counter is set to the skip state. (This latter operation will be described in more detail in the discussion below of FIG. 6.)

After the key number register 26, data length register 32, key length register 31, skip length register 41 and key storage 47 have been loaded with initial values, a skip length countdown (skip field operation) is performed. The key address counter 43 is incremented by one count for each byte of data, starting from the first byte in series, of the data record being scanned. When the counter reaches 256 (i.e., $(256)_{MOD256}=0$), a carry-out signal is generated which causes the scan control logic 29 to change from the skip field operation mode (skip state) to the key field operation mode (key state).

After the skip field operation has been completed, the first eight bits of the search argument is transferred from the key storage 47 through the first buffer 49 to the eight most significant bit positions of the SERDES 50. Data is then shifted into the SERDES 50 in serial fashion from the disk file and a comparison made between the bits in the zeroth and eighth position of the SERDES by the data compare logic 52. It is to be noted that to correctly perform the comparison operation, that is, with the comparison made between like-ordered bits, the most significant bit from the buffer 49 is to be initially inputted to the eighth bit position of the SERDES 50 while the least significant bit from the buffer 49 is inputted to bit position 1 of the SERDES 50. As the serial data is received bit-by-bit from the disk file, the eight bits from the buffer 49 are shifted rightward. One bit of the data received from the buffer 49 is thus dropped for every bit shifted serially into the SERDES 50 from the disk file. When the comparison operation has been completed on the first eight bits received from the buffer 49, another eight bits are transferred into the eight most significant bit positions of the SERDES 50 from the key storage 47 through the buffer 49. Simultaneously with the transfer of eight bits of new search argument from the buffer 49 to the SERDES 50, the eight least significant bits from SERDES 50, corresponding to one byte of the data record, are transferred to the data storage 48 through the buffer 51. To transfer the next succeeding eight bits of search argument into the SERDES 50 from the key storage 47 to the buffer 49, the key address counter 43 is incremented by a count of one. Also, the data address counter 44 is similarly incremented to prepare for the storage of the next succeeding eight bit byte of the data record to be transferred into the data storage 48 from the SERDES 50 through the buffer 51.

This data transfer process continues until the end of the first key field, the length of which is specified by the value KL-1 which was initially stored in the key length register 31. An address compare logic 30 performs a continuous comparison between the value KL-1 stored in the key length register 31 and the output of the key address counter 43. An equality between the two values is indicative of the fact that the last byte of the key field has been reached. In response to a detection that the value of the key address counter is equal to KL-1, the scan control logic 29 resets the key address counter 43 to zero by a pulse on line 38. (This assumes that no "hit" has occurred during the scanning of the first key length of the record. The procedure which is followed when a "hit" is detected will be discussed below.) Also at that time, the key number counter 27 is decremented by one count by the same pulse on line 38.

Next, a counting operation, similar to the skip field operation, is performed for the first data field portion of the record being scanned. This is termed a data field operation, or data state. To shift to the data state, the contents of the temporary register 33, the data length register 32 and the key length register 31 are circulated so that the key length value KL-1 is held in the data register 33 and the data length value DL-1 in the key length register 31. The key address counter 43 is then incremented from zero by one count for each byte of data received from the disk file. When the output value of the key address counter 43 is equal to the data length value DL-1 then stored in the key length register 31 indicating the end of the data field, the address compare logic 30 signals the scan control logic 29 of this fact, whereupon the scan control logic 29 resets the key address counter to prepare for the next succeeding key field operation.

It may be noted that while in the data state, data continues to be transferred into the SERDES 50. This is done so that the data can continuously be transferred into the data storage 48 to accumulate the whole data record. However, the data compare logic 52 during this state is inhibited from performing its comparing operation.

At the start of the next succeeding key field operation period, the contents of the temporary register 33, data length register 32 and key length register 31 are again circulated so that the value KL-1 is present in the key length register 31 and the data length value DL-1 in the data length register 32. Starting from the first or most significant bit of the search argument and key field, the key comparison operation then proceeds in the same manner described above. If no "hit" is encountered during that key field operation period, the record scan circuit 20 again goes into the data field state.

As mentioned above, each time that a key field operation period is completed, the key number counter 27 is decremented by one count. If no "hit" is encountered before the key number counter 27 reaches zero, when zero is reached, scanning ceases for the current data record, and the remainder of the data from that record is merely loaded into the data storage 48.

On the other hand, if a "hit" occurs for a given key field of a record, a different procedure is followed. Specifically, the presence of a "hit" is signaled to the I/O controller on line 46, and also to the scan control logic 29 and the skip length register 41. As soon as the "hit" is signaled, the skip length register 41 stores the value then present on the output of the data address counter 44. At the end of the record processing period, the I/O controller can thus retrieve the data record from the data storage 48 via the bus 18. As mentioned above, depending upon the contents of predetermined ones of the command bits of Word 0 of the search request block of FIG. 2, the entire record may be transferred or only a predetermined portion thereof. Also, the data address counter value retained in the skip register 41 can be retrived by the I/O controller 16 as a "hit" pointer. As this type of transfer to an I/O controller is well known, further description thereof will be omitted at this point.

Figure 5A:
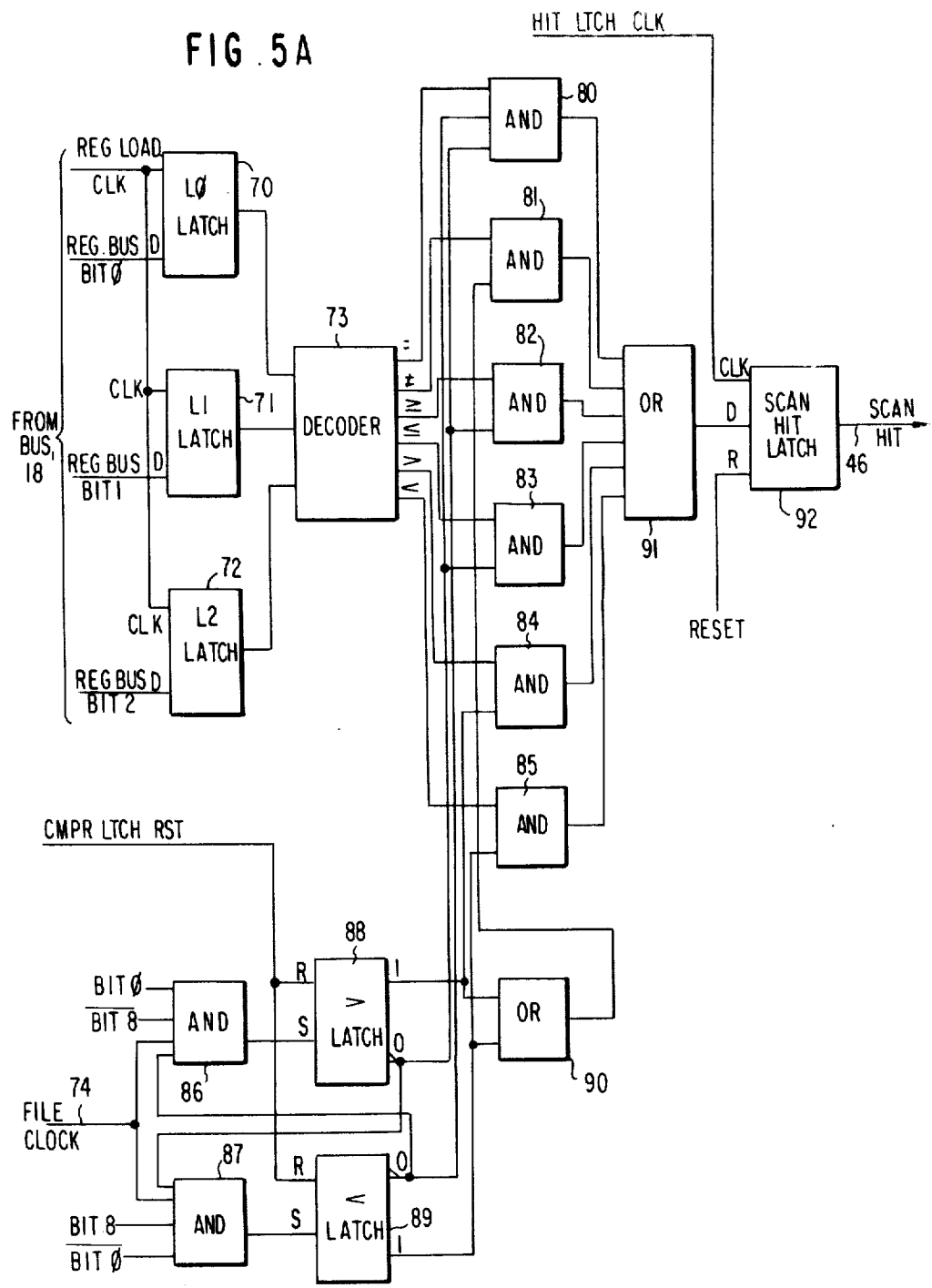
FIGS. 5A and 5B, taken together, are a detailed logic diagram of a data compare logic circuit utilized in the record scan logic of FIG. 4.
Figure 5B:
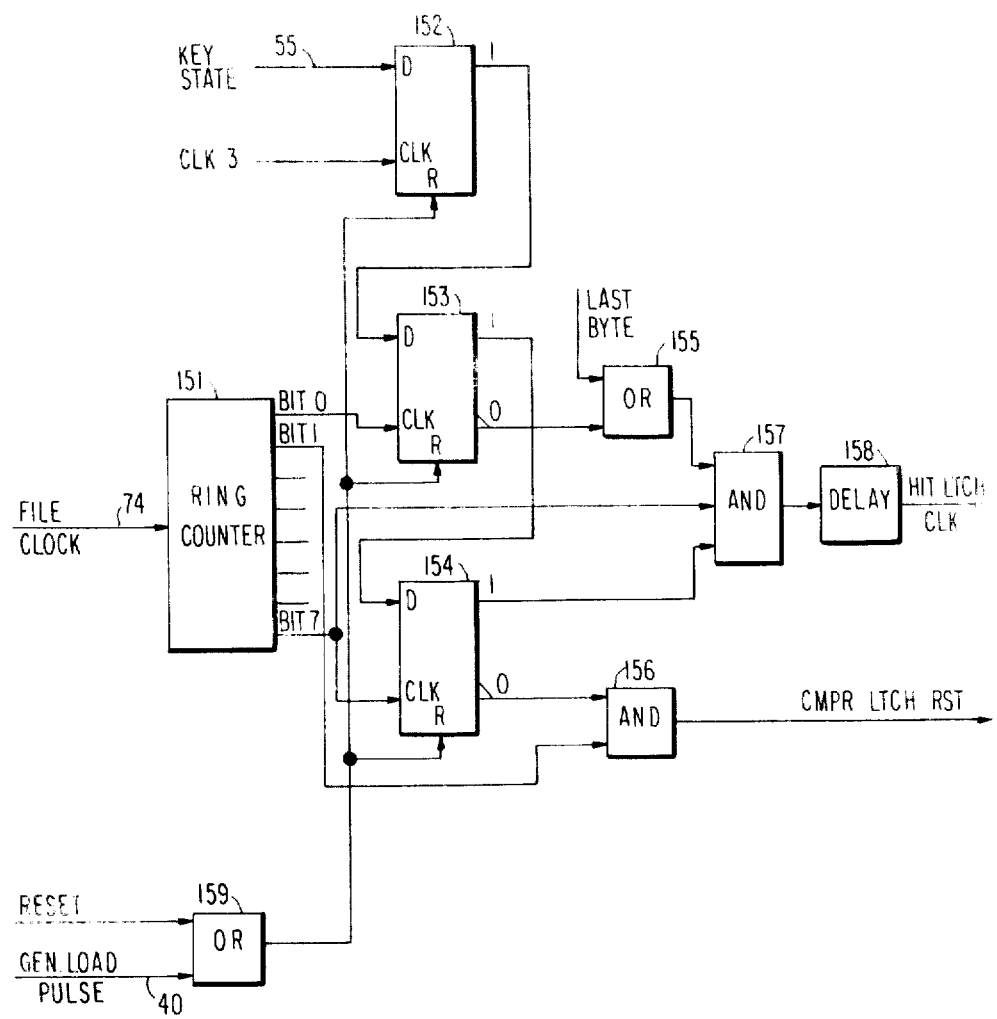

Referring next to FIGS. 5A and 5B, the details of the data compare logic 52 will be explained. Latches L0-L2, 70-72, respectively, are provided for storing three bits from the bus 18 which determine which of the comparisons =, $\neq$, $\geq$, $\leq$ and > is to be performed upon the designated key fields of the data record being scanned. A decoder 73 activates one of the lines, identified by "=", "$\neq$", "$\geq$", "$\leq$", ">" and "<", with a logical "1" depending upon the state of the bits stored in the latches 70-72. If desired, six latches can be provided to receive information from six lines of the data bus 18, only one of which will be active for each scanning operation, to thus select the desired one of the comparison operations. In this case, the decoder 73 can be eliminated.

The various outputs from the decoder 73 are coupled to first inputs of corresponding AND gate 80-85. The zeroth (BIT 0) and eighth (BIT 8) output bits from the SERDES 50 and their complements ($\overline{\text{BIT 0}}$ and $\overline{\text{BIT 8}}$) are supplied to the compare logic 52. Specifically, BIT 0 and $\overline{\text{BIT 8}}$ are applied to two inputs of the AND gate 86 and BIT 8 and $\overline{\text{BIT 0}}$ are applied to corresponding inputs of the AND gate 87. Applied to other inputs of both the AND gates 86 and 87 is the FILE CLOCK signal on line 74 which is synchronous with the bits of data as received from the file, the relative timing of which is adjusted so that its pulses are in the active logical "1" state when the output data from the SERDES is stable. The KEY STATE signal from the scan state counter on line 145 is inverted by an inverter 146 and applied to reset inputs of the latches 88 and 89 to maintain them in the reset state except when in the key state. The outputs from the AND gate 86 and 87 are applied to the set inputs of the latches 88 and 89, respectively. A signal CMPR LTCH RST (compare latch reset) resets the latches 88 and 89. The circuitry for generating this signal is shown in FIG. 5B and will be discussed below.

The inverted output from the latch 88 is connected to one input of the AND gate 87 while the inverted output of the latch 89 is similarly connected to an input of an AND gate 86. Also, the inverted output of the latch 88 is connected to inputs of AND gates 80 and 83, the non-inverted output of the latch 88 connected to inputs of the AND gate 84 and an OR gate 90, the inverted output of the latch 89 connected inputs of AND gates 80 and 82, and the non-inverted output of the latch 89 connected to inputs of the AND gate 85 and the OR gate 90. The output of the OR gate 90 is connected to a second input of the AND gate 81. The outputs of the AND gates 80–85 are ORed together with an OR gate 91, the output of which is connected to the data input of a "D" type flip-flop latch 92. The latch 92 is clocked with a signal HIT LTCH CLK (hit latch clock) produced by the circuitry shown in FIG. 5B. The RESET signal from the I/O controller 16 is connected to the reset input of the flip-flop 92.

Operationally, only a single one of the AND gates 80–85 is activated for a single record scanning operation. For instance, if it is desired to perform an "=" type comparison, the AND gate 80 is activated. In this case, because BIT 0 and BIT 8 will always the same for the entire key field where a "hit" occurs, the outputs from the AND gates 86 and 87 will continuously be logical "0" throughout the key field, so that the inverted outputs from the latches 88 and 89 will then remain in the logical "1" state. The two values of logical "1" from the latches 88 and 89 and the logical "1" from the "=" output from the decoder 73 will all be present throughout the length of the key field and hence at the end of the key field. The AND gate 80 thus outputs a logical "1" through the OR gate 91 to the flip-flop 92 at the end of the key field operation period. The EOKF pulse on line 38 at the end of the key field operation period clocks the latch 92 causing its output to go to the logical "1" state and thus issuing an SCAN HIT signal on line 46 which remains in the active state throughout the remainder of the record scanning operation.

As another example, in the case that the "<" output of the decoder 73 is activated, the AND gate 84 will be selected. If the key field value of the data record being scanned is in fact greater than the search argument, it is a necessary condition that BIT 0 will be in the logical "1" state when BIT 0 is first unequal to BIT 8 in the ordered sequence of bits in the key field. In the serial bit stream prior to this occurrence, BIT 0 will be the same as BIT 8, and hence the outputs from the AND gates 86 and 87 will be continuously logical "0". As soon as BIT 0 becomes logical "1" while BIT 8 is logical "0", the output of the AND gate 86 will to to logical "1", thus placing the non-inverted output of the latch 88 in the logical "1" state. The latch 88 will remain in this state until the end of the scanning of the key field when it is reset. The logical "0" signal from the inverted output of the latch 88 connected to the AND gate 87 prevents the output of the AND gate 87 from ever reaching the logical "1" state during that particular key field opertion period. Thus, once BIT 0 is in the logical "1" state while BIT 8 is in the logical "0" state, a logical "1" will be applied to the input of the AND gate 84 and this will reamin until the end of the particular key field operation period. The logical "1" thus provided at the output at the AND gate 84 is applied through the OR gate 91 to the "D" input of the flip-flop 92 to this generate a SCAN HIT signal at the end of the key field when the flip-flop 92 is clocked by the signal EOKF.

It may similarly be verified by following through the various signals for each of the remaining comparison types $\neq$, $\geq$, $\leq$ and $>$ that a SCAN HIT signal is generated in the appropriate case and in no others.

Referring now to FIG. 5B, the circuitry for generating the CMPR LTCH RST and HIT LTCH CLK signals used in FIG. 5A will be discussed. A seven-bit ring counter 151 is provided which is clocked with the FILE CLOCK signal on line 74. The ring counter 151 thus outputs signals BIT 0, BIT 1 . . . BIT 7 which are in the logical "1" state at the time when the correspondingly numbered bit in a byte from the file is being inputted to the SERDES 50. A D-type latch 152 receives a KEY STATE signal on line 55 from the scan control logic 29. As will be explained below, this signal is in the logical "1" state during the key field operation periods. Latches 153 and 154 are coupled in series following the latch 152. Latch 153 is clocked with BIT 0 while latch 154 is clocked with BIT 7. With this arrangement, the uninverted output from the latch 153 is in the logical "1" state when the buffer 49 contains a key byte ready to be transferred to the SERDES 50 and the uninverted output from the latch 154 is in the logical "1" state when the SERDES 50 contains an entire eight-bit byte of key data received from the disk file.

The signal CMPR LTCH RST is produced by ANDing, with an AND gate 156, the inverted output from the latch 154 and the BIT 1 output from the ring counter 151. The HIT LTCH CLK signal is produced by ANDing with an AND gate 157 and BIT 7 output from the ring counter 151, the uninverted output from the latch 154 and a signal generated by ORing with an OR gate 155 the inverted output from the latch 153 and a signal LAST BYTE from the disk file which is in the logical "1" state for the last byte of a record. The output from the AND gate 157 is delayed by a delay circuit 158 by a time long enough to allow the latches 88 and 89 to settle and their outputs to propagate through the AND gates 80–85 and OR gate 90 to reach the input of the scan bit latch 92 after comparing the last key byte. The latches 152–154 are reset by ORing, with an OR gate 159, the RESET signal from the I/O controller 16 and a GENERAL LOAD PULSE (to be explained below) from the scan control logic 29.

The details of the scan control logic 29 shown in the logic schematic diagram of FIG. 6, will now be discussed.

The data outputs from the key length register 31 and the key address counter 43 are applied to corresponding comparison input ports of the address compare logic 30, which is implemented with a digital comparator and which produces an active output in the logical "1" state when the two numbers input thereto are equal. Also, the data output from the key address counter 43 is applied to a decoder 101 which produces an output signal in the logical "1" state when the output from the key address counter is 255. The data output from the key number counter 26 on lines 28 is applied to a decoder 102 which produces an output in the logical "1" state when the count output from the key number counter 27 reaches zero. The output of the data address counter 30 is similarly applied on lines 35 to a decoder 103 which produces a logical "1" signal on the output line 103A when the output from the data address counter 30 is 255 and a logical "1" output on the line 103B when the output from the data address counter 30 is 254. Similarly, the output from the skip length register 41 on the lines 45 is inputted to a decoder 114 which produces an output of logical "1" when the value inputted thereto from the skip length register 41 is zero.

A decoder network is provided which is constructed of AND gates 106-111, OR gates 115-117, and inverters 104, 105 and 112. The outputs of the OR gates 115-117 are connected as shown to the two latches 121 and 122 of a scan state counter 120. Finally, the outputs of the latches 121 and 122 of the scan state counter 120 are connected as shown to inputs of AND gates 124-126, the outputs of which are in the logical "1" state when the record scan circuit 20 is in the skip state, key state and data state, respectively.

ROTATION STROBE pulses for causing data shifting among the key length register 31, the data length register 32 and the temporary register 33 on lines 35, 36 and 37, respectively, are generated by a circuit composed of AND gates 113, 119 and 127-129, OR gate 118 and latch 123. Clock signals CLK 1, CLK 2 and CLK 3 generated by the clock generator circuit shown below in FIG. 7 are connected to inputs of the AND gates 127-129 as shown.

Circuitry for generating the GENERAL LOAD PULSE on line 40, which causes the loading of the key number counter 27 and the key address counter 43 and the resetting of the data address counter 44, includes AND gates 131, 132 and 134 and latch 133.

FIG. 7 is a diagram showing the clock generating circuitry and the timing relationship between the various clock signals CLK 0-CLK 3. These signals are generated with a master oscillator 98, which is synchronized to the FILE CLOCK on line 74, and a clock generator circuit 99. The oscillator 98 is enabled to produce clock signals at the start of a record scanning operation by a signal ENABLE CLOCK from the I/O controller 16. Also, it may be mentioned that the key address counter 43 is clocked with the CLK 1 signal, the data address counter 44 is clocked with the CLK 2 signal, the key storage 47 is clocked with the CLK 2 signal, and the data storage 48 is clocked with the CLK 3 signal. These connections are not shown in FIG. 4 to avoid a cluttered drawing and also for the reason that the clock signal connections are somewhat arbitrary and may be varied to take into account factors such as the speed of an actually utilized device. As the construction of such circuits to provide the timing relationship shown among the signals CLK 0-CLK 3 is very well known, further description thereof will be omitted.

The operation of the circuit shown in FIG. 6 will be explained in conjunction with the timing diagrams of FIGS. 9A-9E.

As discussed above, at the beginning a record scanning operation, a RESET pulse is applied by the I/O controller 16. This pulse, applied through the OR gates 115 and 117, resets both of the latches 121 and 122. The output of the latches 121 and 122, decoded by the AND gates 124-126, produces a logical "1" on the output of the AND gate 124 and a logical "0" on the outputs of the AND gates 125 and 126, to thus produce a SKIP STATE signal.

If SL=0, that is, if there is no data to be skipped at the beginning of the record scanning operation, a RESET then a SET pulse from the I/O controller 16 place the scan state counter 120 in the key state. Otherwise, if SL≠0, only a RESET pulse is applied to thus place the scan state counter in the key state.

While in the skip state, the key address counter 43 is incremented by one count for each byte of data received by the SERDES 50. When the key address counter 43, which was initialized with a value $(256-SL)_{MOD256}$, reaches a count of $(255)_{MOD256}$, a logical "1" is produced at the output of the decoder 101 which is applied to one input of the AND gate 108. A logical "1" will also then be applied to the input of the AND gate 108 connected to the output of the inverter 105 because the key number counter will not then have reached zero (it is assumed that the number of keys to be scanned is greater than zero). Also, the SKIP STATE signal applied to a third of the inputs of the AND gate 108 will also be in the logical "1" state. When the next CLK 0 pulse is inputted to the fourth input of the AND gate 108, a pulse be outputted thereby which is coupled through the OR gate 116 to the set input of the latch 122. This changes the state of the latch 122, thereby causing AND gates 124-126 which decode the outputs of the latches 121 and 122 of the scan state counter 120 to output the SKIP STATE signal in the logical "0" state, the KEY STATE signal in the logical "1" state, and the DATA STATE signal in the logical "0" state. This transition is shown in the timing diagram of FIG. 9A.

The key address counter 43 continues to be clocked. Its first count value after attaining the key state will be zero (as indicated in FIG. 9A). Following that state, the key address counter is incremented by one count for each eight-bit byte of data loaded into the SERDES 50 so that the search argument is sequentially read byte-by-byte from the key storage 47 through the buffers 49A and 49B into the SERDES 50 to be compared with the incoming data from the disk file.

Figure 9B:
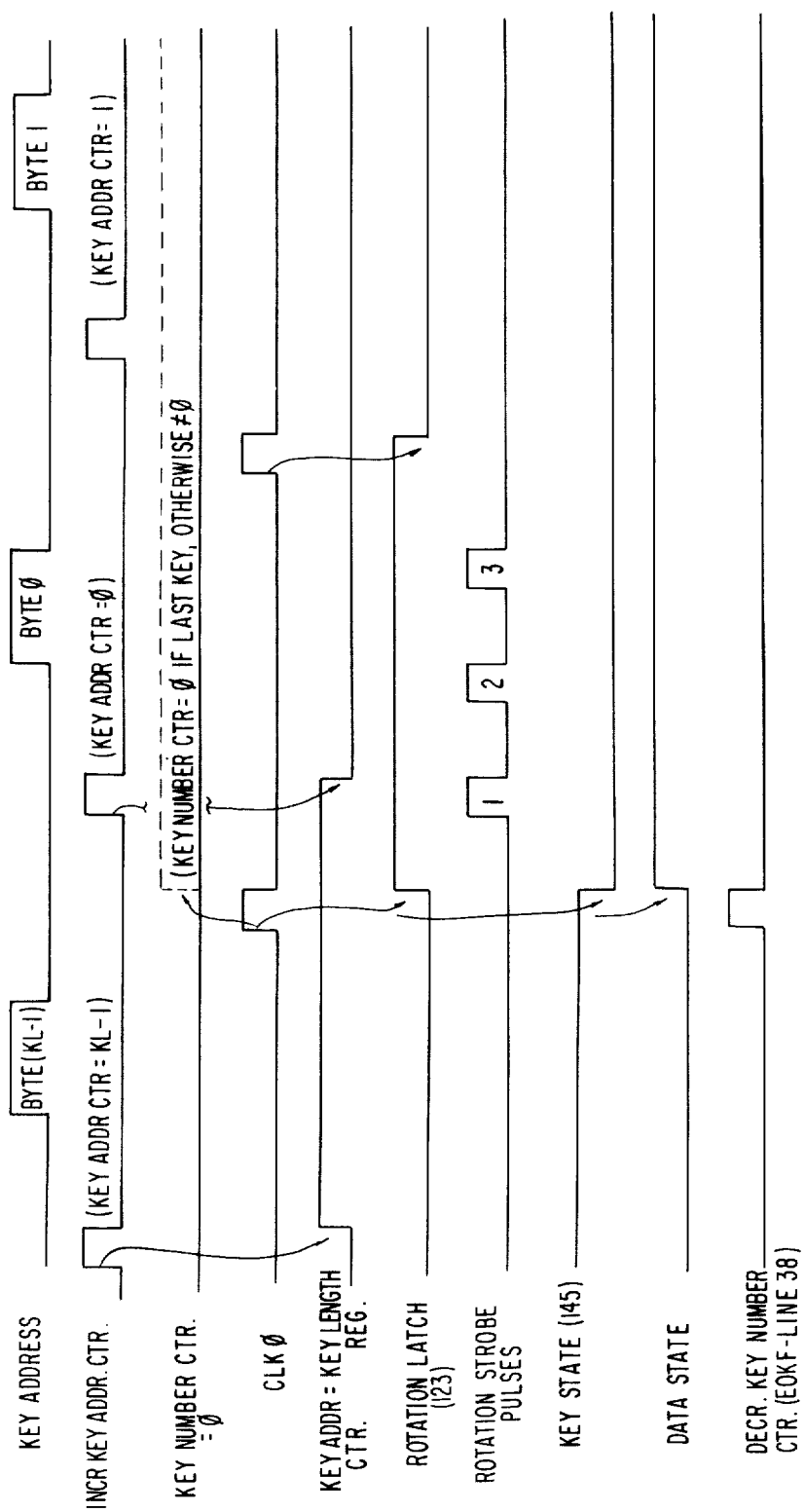
Figure 9C:
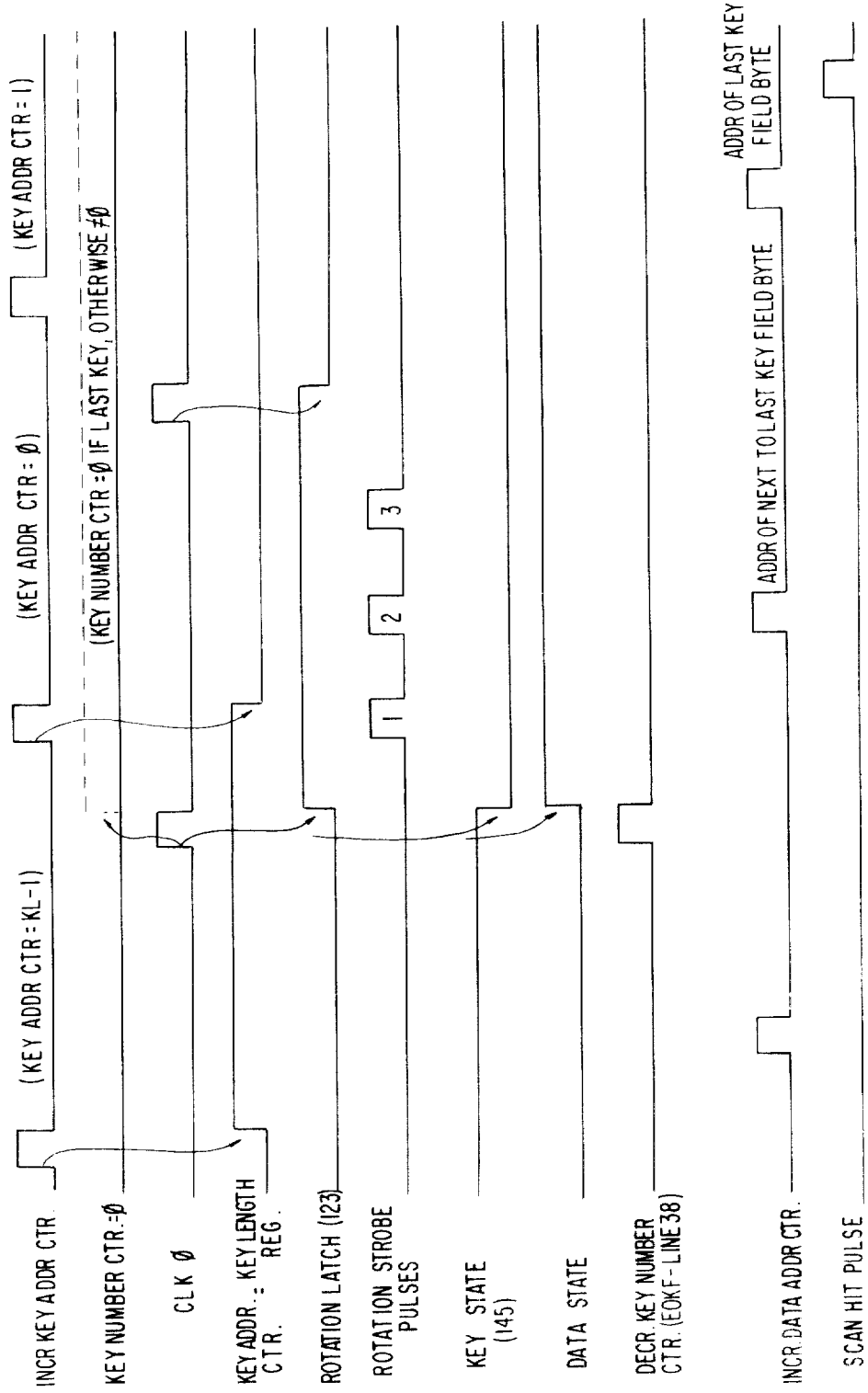

When in the key state the incremented value in the key address counter 43 becomes equal to the value KL-1 stored in the key length register 31, a logical "1" is outputted by the address compare logic 30 and applied to an input of AND gate 106, to another input of which is applied the KEY STATE signal. As shown in FIG. 9B, when the next pulse of the CLK 0 signal is received, a pulse will be outputted by the AND gate 106 (this is the EOKF signal mentioned above) and applied on line 38 to the set input of the latch 121 of the scan state counter 120, to the key number counter 27 to decrement its count, and to the key address counter 43 to reset it to zero.

Assuming that the end of the data record was not reached during the scanning of the first key field, the key number counter 27 will be decremented by a single count and the key address counter 43 reset to zero. Further, the scan state counter 120 will be set so as to activate the DATA STATE signal. It is also necessary at this time to rotate values among the key length register 31, data length register 32 and temporary register 33 so that the data length value DL-1 will be stored in the key length register 31 for the subsequent data field operation period. To accomplish this rotation, ROTATION STROBES 1-3 are produced at outputs of AND gates 127-129 through the use of the OR gate 118, the AND gate 119 and the latch 123. The generation of these strobes is initiated by the EOKF pulse which is applied to one input of the OR gate 118. The pulse transmitted through the OR gate 118 sets the latch 123 which outputs a logical "1" until the next pulse of the CLK 0 signal is applied through the AND gate 119 to the reset input of latch 123 to again set to the latch to the logical "0" state. While the output of the latch 123 is in the logical "1" state, the AND gates 127-129 are permitted to each pass one pulse of the corresponding clock pulse signals CLK 1, CLK 2 and CLK 3, respectively. Once the data in the registers 31, 32 and 33 has been appropriately rotated by these signals, the data field operation state commences.

In the data field operation state, similar to the key field operation state, a comparison is continuously made between the count produced by the key address counter 43 and the value stored in the key length register 31, only in this case the value stored in the key length register 31 is actually the data length value DL-1.

When in fact the data length count being carried out by the key address counter 43 is equal to the value DL-1 stored in the key length register 31, a logical "1" will be outputted from the address compare logic 30 and applied to one input of the AND gate 109. Assuming that the key number counter has not reached zero and no "hit" has occurred previously, the inputs of the AND gate 109 connected to the inverters 104 and 105 will also be in the logical "1" state. Then, when the next pulse of the signal CLK 0 occurs, a pulse will be transmitted by the AND gate 109 through the OR gates 115 and 116 to the reset and set inputs of the latches 121 and 122, respectively. The decoded output of the latches 121 and 122 then again represents the key state so that KEY STATE signal from the AND 125 is in the active or logical "1" state while the SKIP STATE and DATA STATE signals are in the inactive or logical "0" state. This sequence of operations is illustrated by the timing diagram of FIG. 9D. The same sequence of key and data state operations is carried out until either a "hit" occurs or the end of the record is reached.

In the event that a "hit" occurs in any key field, pulse transmission through the AND gate 109 will be inhibited by a logical "0" applied thereto from the inverter 104 so that the scan state counter 120 cannot be returned to the key state after the next succeeding data field operation.

With reference to the timing diagram of FIG. 9E, at the end of the data record when the data address counter 44 reaches a count of 255, a logical "1" on line 103A allows a pulse from the CLK 0 signal to pass through the AND gate 107 and the OR gate 115 to reset the latch 121 of the scan state counter 120. This sets the scan state counter 120 in the skip state for the beginning of the next record scanning operation.

If the end of the record is reached before the end of a key field being scanned is reached, the scan state counter 120 will be set so as to activate the SKIP STATE signal. In this case, when the data address counter reaches a count of 255, the line 103A from the decoder 103 will be placed in the logical "1" state. This signal is coupled to one input of the AND gate 111. If the skip length is other than zero, another logical "1" will be applied to a second input of the AND gate 111 by the inverter 112. When the next pulse of the CLK 0 signal is received, an output pulse from the AND gate 111 will be coupled through the OR gate 117 to the reset input of the latch 122, thereby setting the scanning state counter 120 in such a condition as to activate the SKIP STATE signal and deactivate the KEY STATE and DATA STATE signals for the next record scanning operation.

Also at the end of the data record, if in the data state, it is necessary to generate the ROTATION STROBES 1-3. (This is not to be done if the end of the data record is reached while in the key state.) This is done when the count of the data address counter is 254. In this case, the line 103B from the decoder 103 will be in the logical "1" state thereby applying a logical "1" to one input of the AND gate 113. With the DATA STATE in the logical "1" state, the next pulse of the CLK 0 signal will pass through the AND gate 113 and the OR gate 118 to thereby set the latch 123. The ROTATION STROBE signals are then generated in the same manner discussed above.

Further, at the end of the data record, a GENERAL LOAD PULSE is generated at the output of the AND gate 134 to load the key number counter 27 from the key number register 26 and to load the key address counter 43 from the skip length register so as to be ready to perform the next skip field counting operation. The GENERAL LOAD PULSE on line 40 is generated when the data address counter reaches the count of 255 and consequently a logical "1" is present on the line 103A. When the signal on line 103A first goes to logical "1", the next pulse of the CLK 0 signal will pass the AND gate 131 and set the end of record latch 133, thereby also enabling the AND gate 132. The next pulse of the CLK 0 signal will then pass the AND gate 132 and reset the latch 133. The output of the latch 133 is "anded" with the CLK 2 signal by the AND gate 134 to produce the GENERAL LOAD PULSE signal.

A special case of a data record scanning operation is when the skip length is zero, that is, when the first byte of data received from the disk file in a data record is part of a key field. In this case, the skip state is never attained during the entire record scanning operation. For this case, the output from the decoder 114 will be in the logical "1" state the AND gate 111 inhibited due to the presence of a logical "0" on the output of the inverter 112. This prevents transfer to the skip state. Also, a logical "1" is applied to one input of the AND gate 110 from the decoder 114. Thus, when the end of the data record is reached, a logical "1" is applied on line 103A to another input of the AND gate 110. When the first pulse of the CLK 0 signal is received after the line 103A goes to the logical "1" state, a pulse passes through the AND gate 110 and the OR gate 116 to set the latch 122. In this way, the key state will be obtained directly without going through the skip state.

Figure 8A:
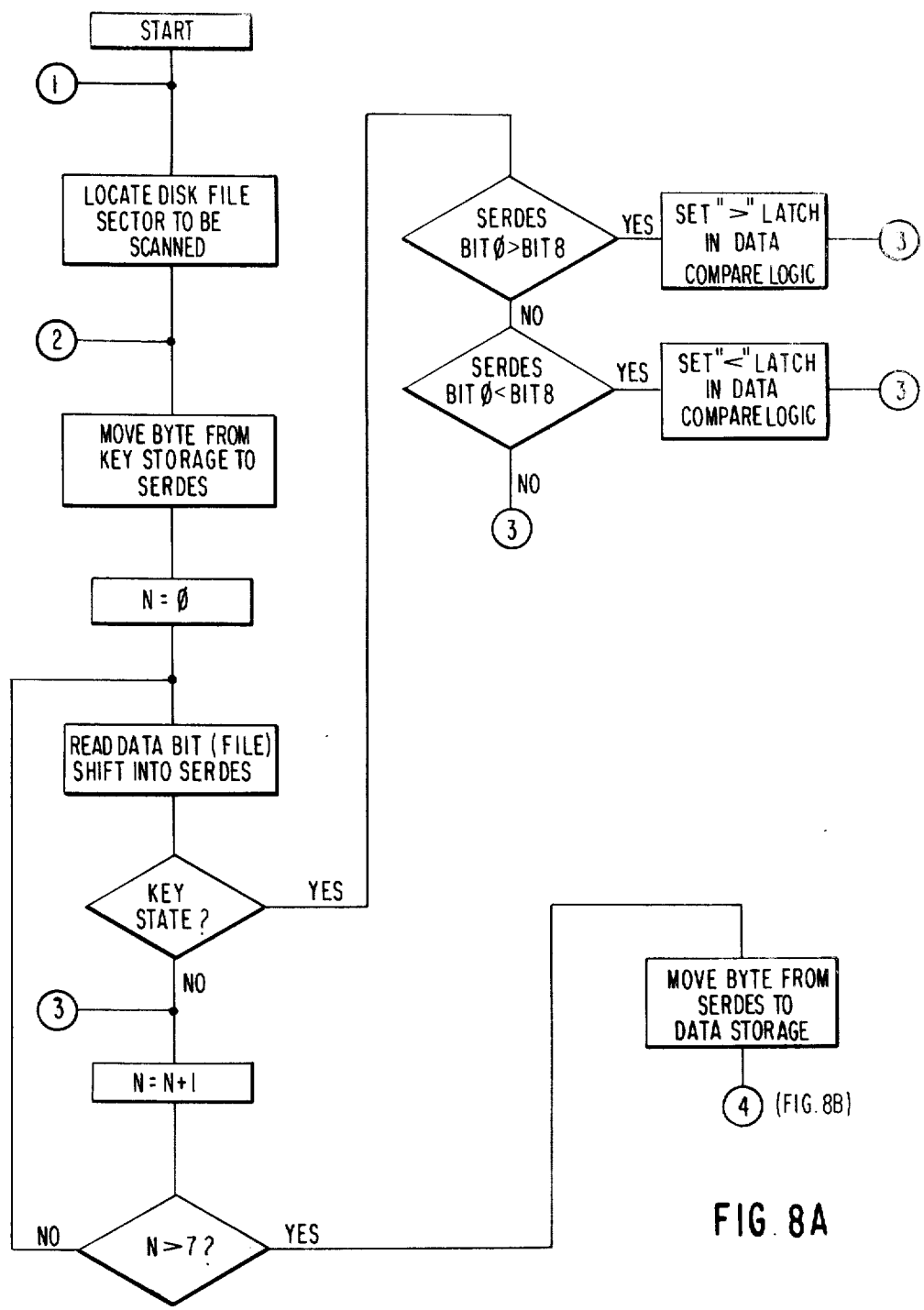
FIGS. 8A-8C are a series of flow charts used for explaining the operation of the record scan circuit of FIG. 4.
Figure 8B:
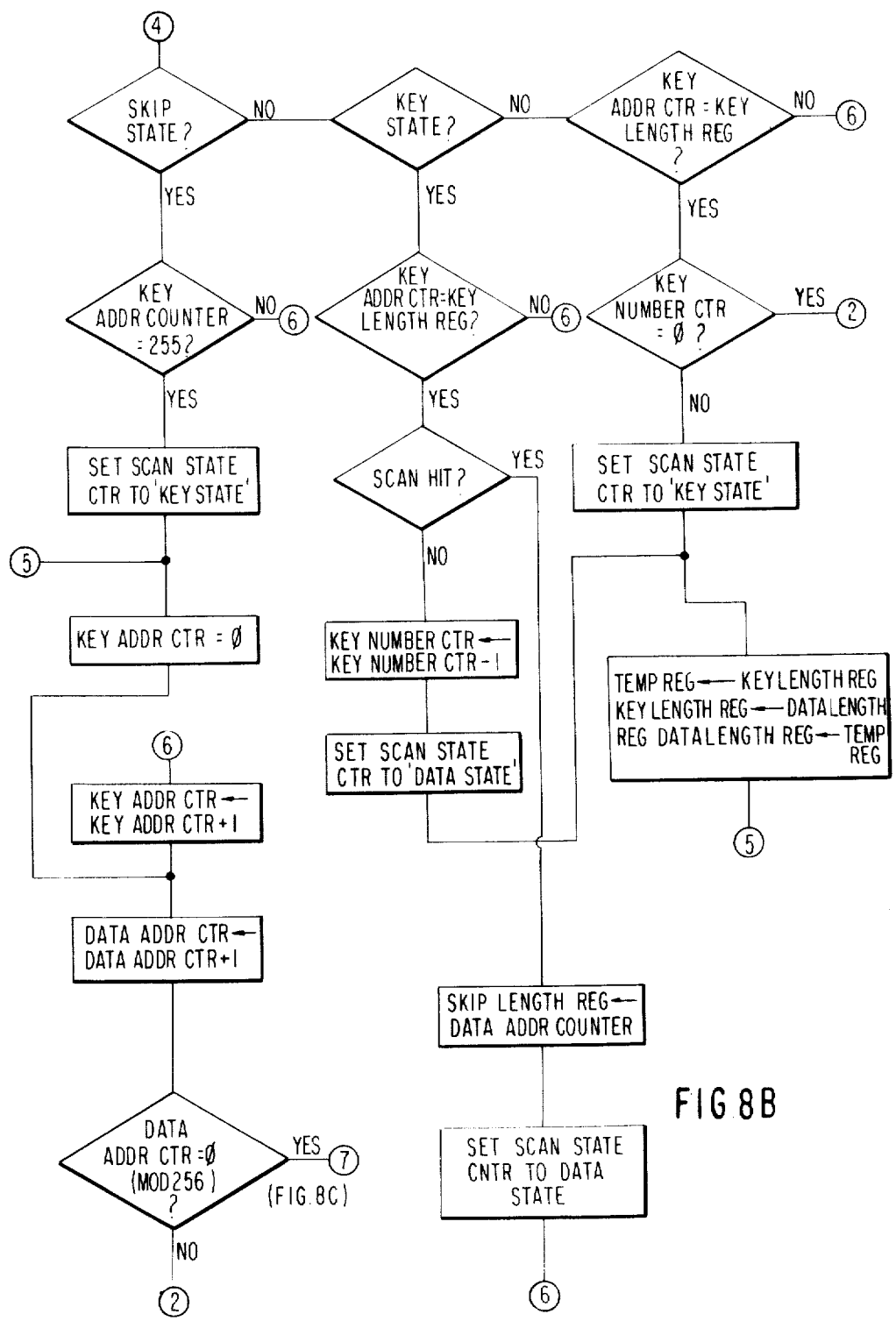
Figure 8C:
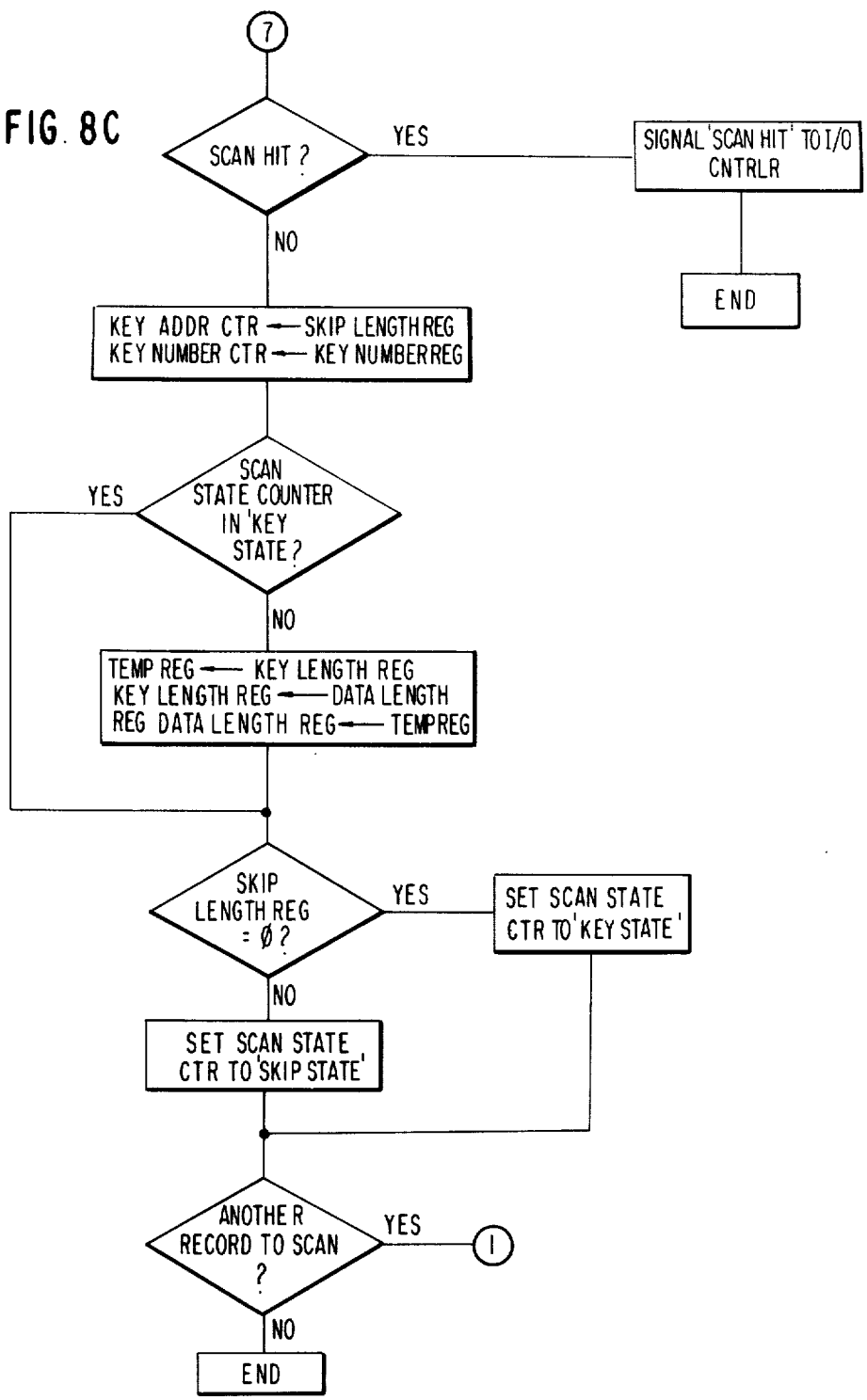

The method of performing a record scan search and the operation of the record scan circuit of the invention are summarized in the flow charts of FIGS. 8A-8C. At the start position in the flow chart of FIG. 8A (where it is assumed that the various initial values have all been set), the disk file sector to be scanned is first located by the I/O controller 16 and the device control unit 21, after which the first byte of the sequence of records to be scanned is loaded in the SERDES 50 through the first buffer 49. This data is serially shifted into the SERDES 50. If the circuit is not in the key state, the shifting of the serial data into the SERDES 50 proceeds until eight bits have been loaded thereinto. At that point, the first byte of data from the SERDES is loaded into the data storage 48 through the search buffer 51.

Then, as shown beginning at point 4 of the flowchart of FIG. 8B, if the circuit is still in the skip state and the content of the key address counter is not 255, the key address counter 43 and the data address counter 44 are incremented by one count. If the end of the data record has not yet been reached, as indicated by the output of the data address counter 44 being other than zero, the procedure loops back to the point 2 indicated in FIG. 8A and another byte is moved from the key storage to the SERDES 50.

If, on the other hand, while still in the skip state the key address counter reaches 255, the scan state counter is set to the key state, following which the key address counter reaches the zero count and then begins the key state counting operation. The data address counter is again incremented by a single count.

In the key state, the circuit operation passes point 2 through point 4 in FIGS. 8A and 8B. If upon receiving the first byte of data into the SERDES 50 after achieving the key state the key address counter content is not equal to the value stored in the key length register, moving to point 6 in FIG. 8B, the key address counter the data address counter are incremented by one count, and the process continues until the end of the key field. At the end of the key field, if no "hit" has occurred, the key number counter 27 is decremented by one count and the DATA STATE signal activated. The initial value data is then rotated among the key length register 31, data length register 32 and the temporary register 33, and then the key address counter is set to zero and the data address counter incremented by one count. If a "hit" has in the fact occurred, the value then in the data address counter is stored in the skip length register 41, the scan state counter 120 is set to the data state, and then the procedure returns to point 6.

Moving from point 5 through points 2, 3 and 4 in the flow charts of FIGS. 8A and 8B, the key address counter is set to zero and the data address counter incremented. With the circuit then in the data state, the operations proceed as shown in the right-hand column of the flowchart of FIG. 8B. The key address counter is incremented until it reaches the value stored in the key length register (DL-1 for the data state). Once this value is reached, if the last key has not been reached as indicated by the key number counter 27 having a value of other that zero, the scan state counter 120 is changed to the key state, the data rotated among the registers 31, 32 and 33, after which the operation proceeds from point 5 in FIG. 8B. If, on the other hand, the key number counter has reached zero, the operation loops back to point 2 to either begin the scanning of the subsequent key field or switched to the skip state.

Referring back to the diagram of FIG. 8A, when in the key state, BIT 0 and BIT 8 are compared to determine whether or not a "hit" has occurred. For a complete explanation of the comparison operation, reference may be made to the explanation above of the circuitry of FIG. 5.

When the data address counter reaches zero signifying the end of the record scanning operation, the operation proceeds to point 7 at the top of the flow chart of FIG. 8C. If a "hit" has occurred, the I/O controller 16 is so informed, after which the procedure is at an end. The I/O controller can then read the pertinent data. If no "hit" has occurred, the value stored in the skip length register 41 is moved to the key address counter 43 and the value then stored in the key number register 27 transferred to the key number counter 27. If the value stored in the skip length register 41 is zero, the scan state counter 120 is retained in the key state. On the other hand, if the value stored in the skip length register 41 is other than zero, the scan state counter is set to the skip state for the next record scanning operation. If the scan state counter is not in the key state at the end of the record, the data is rotated among the key length register 31, data length register 32 and temporary register 33. If there are no further records to be scanned, the procedure will be at an end. If there are in fact further records to be scanned, the operation proceeds back to point 1 shown in FIG. 8A to begin again.

This completes the description of the preferred embodiments of the invention. Although preferred embodiments have been described, it is believed that numerous alterations and modifications thereto would be apparent to one having ordinary skill in the art without departing from the spirit and scope of the invention.

We claim:

1. A method for performing a search of data records comprising the steps of:
    specifying values of a skip length, key length and data length and providing a search argument corresponding in length to said key length;
    providing a serial stream of data from a file having data records to be searched commencing from a predetermined location in said file; and
    for each data record received from said file, performing a comparison operation by skipping an initial length of said data of said record from the beginning of said record with said initial length being determined by said skip length, and subsequently repetitively and alternatingly comparing said search argument with a key field of said data having a length specified by said key length and skipping a next succeeding data field of said data having a length specified by said data length.

2. The method of claim 1, further comprising the steps of:
    providing an indication if a favorable comparison has occurred between said search argument and a key field of said record during said comparing; and
    scanning a next succeeding data record if no favorable comparison occurs.

3. The method of claim 2, further comprising the step of specifying a type of comparison to be made between said search argument and said key fields of said record.

4. The method of claim 3, where said type of comparison is selected from among $=$, $\neq$, $\geq$, $\leq$, $>$ and $<$.

5. The method of any one of claims 1-4, further comprising the steps of:
    storing each data record as it is received from said file; and
    transferring at least a predetermined portion of said data record to utilization means if a successful comparison has occurred.

6. The method of claim 1, wherein said step of comparing said search argument with said key fields of said record comprises serially comparing bit-by-bit data that is received from said file with correspondingly ordered bits of said search argument in said key fields.

7. The method of claim 1, further comprising the step of supplying a value of a key number representing a number of key fields to be scanned in each said record, and skipping data in each said record following scanning therein of a number of key fields equal to said key number.

8. The method of claim 1, further comprising the steps of:
    storing said search argument in a memory; and
    in each said key field, sequentially addressing said memory to read out and compare bytes of said search argument with corresponding bytes of said key field.

9. The method of claim 8, further comprising the steps of:
    comparing addresses to said memory with said key length value; and
    switching from an operation of comparing said search argument with said key field to an operation of skipping a next succeeding data field when an address to said memory bears a predetermined relationship to said key length value.

10. The method of claim 9, further comprising the steps of:
in each said data field, counting a number of bytes of data received from said file;
comparing the count of said number of bytes of data received from said file with said data length value; and
switching from an operation of counting said number of bytes of data received from said file in said data field to an operation of comparing said search argument with data in a next succeeding key field when said count of said number of bytes of data received from said file in said data field bears a predetermined relationship to said data length value.

11. The method of claim 10, wherein said step of sequentially addressing said memory in said key fields and said step of counting said bytes of data received from said file in said data fields are performed by a single counter.

12. The method of claim 11, further comprising the steps of:
storing said key length value and said data length value in respective first and second registers;
rotating data among said first and second registers and a third register upon either of said steps of switching such that said key length value is in said second register for key fields and said data length value is in said second register for data fields; and
wherein said steps of comparing addresses to said memory with said key length value and comparing the count of said number of bytes of data received from said file with said data length value comprise comparing a content of said second register with an output of said counter.

13. A method for performing a search of data records received from a file comprising the steps of:
(a) specifying values of a skip length, a key length, a data length and a key number, providing a search argument corresponding in length to said key length, and specifying a type of comparison operation to be performed;
(b) providing a serial stream of data from said file commencing from a predetermined location, wherein data is supplied serially from said file for a plurality of successive records to be scanned;
(c) counting bytes of data received from said file in each said data record until a number of bytes corresponding to said skip length has been reached;
(d) serially comparing said search argument with data in said record while counting a number of bytes of data received from said file until the number of bytes received is equal said key length;
(e) changing a count of a number of key fields scanned in said data record;
(f) counting a number of bytes received from said file until a number of bytes received is equal to said data length;
(g) repeating said steps (d), (e) and (f) until said count of said number of key fields reaches said key number or until an end of said record is reached; and
(h) if at any time during said step (d) a successful comparison is found, providing a signal indicating that said successful comparison has occurred.

14. The method of claim 13, further comprising the step of storing said data as it is received from said file.

15. The method of claim 13, wherein said step (d) of comparing said search argument with data received from said file comprises the steps of:
(i) receiving data from said file in a serial single bit stream;
(ii) supplying a first byte of said search argument of a predetermined length;
(iii) comparing a first bit of data received from said file after the start of said step (d) with a first order bit of said byte of said search argument;
(iv) simultaneously shifting said byte of said search argument and receiving a second bit of said data from said file;
(v) comparing said second bit of said data received from said file with a second order bit of said byte of said search argument;
(vi) continuing to receive serially bits of data from said file while simultaneously shifting said byte of said search argument and comparing bits of said data received from said file with like-ordered bits of said search argument until a last bit of said byte of said search argument is reached;
(vii) supplying a next succeeding byte of said search argument; and
(viii) repetitively performing steps (i) to (vii) until a number of bytes of data received from said file equal to said key length have been compared with bytes of said search argument.

16. The method of claim 15, further comprising the step of transferring at least a predetermined portion of said data record to utilization means if a successful comparison occurs in said step (d).

17. An apparatus for performing a search of data records comprising:
means for specifying values of a skip length, a key length, a data length and a search argument corresponding in length to said key length;
means for providing a serial stream of data from a file storing data records to be searched commencing from a predetermined location in said file;
means for skipping an initial length of said data of said record from the beginning of said record with said initial length being determined by said skip length;
means for comparing said search argument with a key field of said data having a length specified by said key length; and
means for skipping a next succeeding data field of said data having a length specified by said data length.

18. The apparatus of claim 17, further comprising:
means for providing an indication if a favorable comparison has occurred between said search argument and a key field of said record during comparison of said search argument with said key field.

19. The apparatus of claim 17, wherein said means for comparing said search argument with said key fields of said record comprises means for serially comparing bit-by-bit data that is received from said file with correspondingly ordered bits of said search argument in said key fields.

20. The apparatus of claim 17, further comprising:
means for supplying a value of a key number representing a number of key fields to be scanned in each said record; and
means for skipping data in each said record following scanning therein of a number of key fields equal to said key number.

21. The apparatus of claim 17, further comprising:
memory means for storing said search argument; and means for sequentially addressing said memory means to read out bytes of said search argument to said means for comparing said search argument with said key field.

22. The apparatus of claim 21, further comprising:
means for comparing addresses to said memory with said key length value; and
means for switching from a first operation of comparing said search argument with said key field to a second operation of skipping a next succeeding data field when an address to said memory bears a predetermined relationship to said key length value.

23. The apparatus of claim 22, further comprising:
means for counting a number of bytes of data received from said file in each said data field;
means for comparing the count of said number of bytes of data received from said file with said data length value; and
means for switching from said second operation to said first operation when said count of said number of bytes of data received from said file in said data field bears a predetermined relationship to said data length value.

24. The apparatus of claim 23, wherein said means for sequentially addressing said memory in said key fields and said means for counting said bytes of data received from said file in said data fields comprise a single counter.

25. The apparatus of claim 24, further comprising:
first and second register means for storing said key length value and said data length value, respectively;
a third register; and
means for rotating data among said first and second registers and said third register upon switching from said first operation to said second operation and upon switching from said second operation to said first operation such that said key length value is in said second register for key fields and said data length value is in said second register for data fields.

26. The apparatus of claim 25, wherein said means for comparing addresses to said memory with said key length value and said means for comparing the count of said number of bytes of data received from said file with said data length value together comprise means for comparing a content of said second register with an output of said counter.

27. A computer system in which scanning of data records stored on disk files is performed outside of a host central processing unit, comprising:
a first central processing unit and a main memory coupled to said first central processing unit;
an input/output controller connected to an input/output bus of said first central processing unit;
at least one disk file and a control unit for operating said disk file coupled to an input/output bus of said input/output controller; and
a record scan circuit coupled to said input/output bus of said input/output controller and coupled to said at least one disk file for receiving data serially from said disk file starting at a predetermined location where scanning of data records is to be commenced, said record scan circuit comprising:
a key number register; a data length register; a key length register; a skip length register; a key storage memory, said key number register, said data length register, said key length register, said skip length register and said key storage memory being coupled to said input/output controller to be preset by said input/output controller through said input/output bus with values corresponding to a key number, data length, key length, skip length and a search argument, respectively; a key number counter receiving a preset input from said key number register; a key address counter receiving a preset input from said skip length register, an output of said key address counter addressing said key storage memory; a data storage memory; a data address counter having an output addressing said data storage memory; first buffer means receiving bytes of data from said key storage memory; shift register means receiving a preset input from said first buffer means on all bits thereof except for a lowest order bit, said shift register means receiving at said lowest order bit a serial stream of data from said data file; second buffer means receiving data from said shift register means from all but a highest order bit thereof, an output of said second buffer means being coupled to a data input of said data storage means; data comparing means for comparing said lowest order bit and said highest order bit of said shift register means; and means for controlling said records scan circuit such that each data record received from said disk file is divided into an initial skip field and alternating key fields and data fields, the length of said skip field being determined by said skip length value stored in said skip length register, the length of said key fields being determined by said key length value stored in said key length register, the length of said data fields being determined by said data length value stored in said data length register, and the number of said key fields being determined by said key number value stored in said key number register, wherein, for each said data record received from said data file, said skip field is skipped, said search argument stored in said key storage memory is compared bit-by-bit with said key field by said data comparing means, and each said data field is skipped.

28. The computer system of claim 27, further comprising:
a temporary register, said temporary register, said data length register and said key register being coupled together in a re-circulating loop; and
address comparing means for comparing the output from said address counter with a content of said key length register; and
wherein said controlling means comprises means for circulating contents among said temporary register, said data length register and said key length register in response to an output from said address comparing means such that, for key fields, the content of said key length register is said key length, and for data fields, said content of said key length register is said data length.

29. The computer system of claim 28, wherein said key address counter and said data address counter are reset to a zero condition by said input/output controller through said input/output bus of said input/output controller at the beginning of a record scanning operation.

* * * * *